(12) United States Patent
Uretzky et al.

(10) Patent No.: US 10,176,536 B2
(45) Date of Patent: Jan. 8, 2019

(54) METHODS AND SYSTEMS FOR LOCATION BASED GROUP "MEET-UP" VENUE/TIME RECOMMENDATION AND POLL

(71) Applicant: MAVENIR LTD., Raanana (IL)

(72) Inventors: Omer Uretzky, Ramat Hasharon (IL); Noga Amit, Beer Yaacov (IL); Amit Braytenbaum, Lehavim (IL)

(73) Assignee: Mavenir LTD, Raanana (IL)

( * ) Notice: Subject to any disclaimer, the term of this patent is extended or adjusted under 35 U.S.C. 154(b) by 344 days.

(21) Appl. No.: 15/053,618

(22) Filed: Feb. 25, 2016

(65) Prior Publication Data

US 2016/0253329 A1    Sep. 1, 2016

Related U.S. Application Data

(60) Provisional application No. 62/121,534, filed on Feb. 27, 2015.

(51) Int. Cl.
*G06F 17/30* (2006.01)
*G06Q 50/00* (2012.01)
*G06Q 10/10* (2012.01)

(52) U.S. Cl.
CPC .............. *G06Q 50/01* (2013.01); *G06Q 10/10* (2013.01)

(58) Field of Classification Search
CPC ........................................................ G06F 17/30
USPC ................................................. 707/706, 723
See application file for complete search history.

(56) References Cited

U.S. PATENT DOCUMENTS

| 7,236,799 | B2 | 6/2007 | Wilson et al. |
| 7,522,715 | B1 * | 4/2009 | Burg ................... H04M 3/4228 379/92.02 |
| 7,899,468 | B2 | 3/2011 | Lohtia et al. |
| 8,364,170 | B2 | 1/2013 | Lohtia et al. |
| 8,428,561 | B1 | 4/2013 | Vance et al. |
| 8,571,580 | B2 | 10/2013 | Altman et al. |
| 8,631,070 | B2 | 1/2014 | Vance et al. |
| 8,682,346 | B2 | 3/2014 | Lohtia et al. |
| 8,719,198 | B2 * | 5/2014 | Zheng ................... G01C 21/20 706/21 |
| 2007/0281690 | A1 | 12/2007 | Altman et al. |
| 2007/0281716 | A1 | 12/2007 | Altman et al. |
| 2013/0080204 | A1 | 3/2013 | Khorashadi et al. |
| 2013/0132145 | A1 * | 5/2013 | Hurewitz ........... G06Q 10/1095 705/7.19 |

(Continued)

*Primary Examiner* — Kim T Nguyen
(74) *Attorney, Agent, or Firm* — Ohlandt, Greeley, Ruggiero & Perle, L.L.P.

(57) ABSTRACT

Disclosed are methods and systems for locating, filtering, ranking and then providing a selection of potential "meet-up" venue(s) and time(s) recommendations to a group of users of a device having an interface and a display (e.g., a smart phone or a tablet) based on the geographic area delineated by a user and the user's contacts who are invited to the "meet-up". The methods and systems calculate, filter and rank the most convenient "meet-up" venue and time based on the current location of group members, taking into account a plurality of factors, such as time, distance, schedule, group member's interests, availability, and the like. The methods and systems then provide a selection of the top ranking "meet-up" venues to the group members. Thereafter, the group members vote for the most suitable location among the ranked "meet-up" venues.

20 Claims, 4 Drawing Sheets

(56) References Cited

U.S. PATENT DOCUMENTS

| | | | |
|---|---|---|---|
| 2013/0290172 A1* | 10/2013 | Mashinsky | G06Q 20/12 |
| | | | 705/39 |
| 2014/0025490 A1 | 1/2014 | Shekar et al. | |
| 2014/0075004 A1* | 3/2014 | Van Dusen | H04L 41/04 |
| | | | 709/223 |
| 2014/0162698 A1 | 6/2014 | Han | |
| 2015/0254918 A1* | 9/2015 | Miller | G07C 13/00 |
| | | | 705/12 |
| 2016/0080438 A1* | 3/2016 | Liang | G06F 3/04812 |
| | | | 715/753 |
| 2017/0235848 A1* | 8/2017 | Van Dusen | H04L 41/04 |
| | | | 705/12 |

* cited by examiner

FIG. 1

METHODS AND SYSTEMS FOR LOCATION BASED GROUP "MEET-UP" VENUE/TIME RECOMMENDATION AND POLL

CROSS-REFERENCED APPLICATION

This application claims priority to U.S. Provisional Application No. 62/121,534 filed on Feb. 27, 2015, that is incorporated herein in its entirety by reference.

BACKGROUND OF THE DISCLOSURE

1. Field of the Disclosure

The present disclosure relates generally to methods and systems for locating, filtering, ranking and then providing a selection of potential "meet-up" venue(s) and time(s) recommendations to a group of users of a device having an interface and a display (e.g., a smart phone or a tablet) based on the geographic area delineated by a user and the user's contacts who are invited to the "meet-up". The methods and systems calculate and rank the most convenient "meet-up" venue and time based on the current location of group members, taking into account a plurality of factors. Thereafter, the group members vote for the most suitable location among the ranked "meet-up" venues.

2. Background of the Disclosure

Some methods and systems for locating potential meeting venues for a user of a mobile device and his/her contacts are known. Located venues are presented to the group (i.e., the user and his/her contacts) of users having devices with an interface and a display (e.g., a smart phone or a tablet) for a vote on which venue to select. However, one shortcoming of the known methods and systems is that they are applied in limited geographic areas. Another shortcoming of the known methods and systems is that the potential meeting venues are not filtered or ranked as to likelihood of desirability for the group of users.

SUMMARY OF THE DISCLOSURE

It is an object of the present disclosure to provide methods and systems that make it possible to set up ad-hoc group meetings and identify most convenient "meet-up" places based on group members' current location, availability and preferences.

It is also an object of the present disclosure to provide methods and systems to provide users with "meet-up" venues that best fit their collective desires without the need to have long conversations and debates between the users.

It is a further object of the present disclosure to provide methods and systems to provide users with a comprehensive digital profile card to allow users to learn more about the business that is chosen as the recommended "meet-up".

These and other objects are met according to the present disclosure, as will be more fully described in the paragraphs that follow.

The overall flow of the method that the system performs is: the user creates a "meet-up" request and shares it with a plurality of users' contacts; the users' contacts receive the "meet-up" invitation; the users' contacts can accept or deny the "meet-up" request, and the users who accept the "meet-up" request are presented with potential "meet-up" venues; the users vote on the potential "meet-up" venues; optionally, the users are provided with a "view map" of the potential "meet-up" venues while voting is taking place; and the users are provided with the results of the vote of the winner of the "meet-up" venue. Preferably, the methods and systems also provide each user with time to arrive at the "meet-up" venue from each user's present location. Also preferably, the users are provided with a digital "business card" for the selected "meet-up" venue.

In one embodiment, the present disclosure provides a method that comprises: receiving a "meet-up" request from a user of a device; receiving an identification of a plurality of the user's contacts to receive a transmission of the "meet-up" request to form a group of identified contacts; transmitting the "meet-up" request to the identified contacts; receiving, from each identified contact, an indication of whether the identified contact accepts or declines the "meet-up" request to form a group of accepted contacts (and preferably a group of declined contacts); identifying a point location of each accepted contact; creating a polygon from the identified point locations; identifying the centroid of the polygon; locating potential "meet-up" venues in a geographic area defined by a radius around the centroid; scoring the located potential "meet-up" venues; filtering and ranking the scored potential "meet-up" venues; providing filtered and ranked "meet-up" venue options to the user and the accepted contacts; receiving votes from the user and the accepted contacts relating to "meet-up" venue option selections; identifying the "meet-up" venue receiving the most votes; and providing the identity of the "meet-up" venue receiving the most votes to the user and the accepted contacts. Optionally, the method further includes providing "business card" details relating to the selected "meet-up" venue option receiving the most votes to the user and the accepted contacts. Also optionally, the method further includes providing an indication of the time to the user and the accepted contacts as to how long it will take each to arrive at the selected "meet-up" venue option.

The present disclosure further provides an apparatus/system for identifying and selecting a venue for a user and a group of the user's contacts to "meet-up" that includes a processor and a memory that has instructions that are readable by the processor and cause the processor to: receive a "meet-up" request from a user of a device; receive an identification of a plurality of the user's contacts to receive a transmission of the "meet-up" request to form a group of identified contacts; transmit the "meet-up" request to the identified contacts; receive, from each identified contact, an indication of whether the identified contact accepts or declines the "meet-up" request to form a group of accepted contacts and a group of declined contacts; identify a point location of each accepted contact; create a polygon from the identified point locations; identify the centroid of the polygon; locate potential "meet-up" venues in a geographic area defined by a radius around the centroid; score the located potential "meet-up" venues; filter and rank the scored potential "meet-up" venues; provide the filtered and ranked "meet-up" venue options to the user and the accepted contacts; receive votes from the user and the accepted contacts relating to "meet-up" venue option selections; identify the "meet-up" venue receiving the most votes; and provide the identity of the "meet-up" venue receiving the most votes to the user and the accepted contacts. Optionally, the apparatus/system further causes the processor to provide "business card" details relating to the selected "meet-up" venue option receiving the most votes to the user and the accepted contacts. Also optionally, the apparatus/system further causes the processor to provide an indication of the time to the user and each accepted contact as to how long it will take for each to arrive at the selected "meet-up" venue option.

The present disclosure still further provides a storage device comprising instructions that are readable by a processor and cause the processor to: receive a "meet-up" request from a user of a device; receive an identification of a plurality of the user's contacts to receive a transmission of the "meet-up" request to form a group of identified contacts; transmit the "meet-up" request to the identified contacts; receive, from each identified contact, an indication of whether the identified contact accepts or declines the "meet-up" request to form a group of accepted contacts and a group of declined contacts; identify a point location of each accepted contact; create a polygon from the identified point locations; identify the centroid of the polygon; locate potential "meet-up" venues in a geographic area defined by a radius around the centroid; score the located potential "meet-up" venues; filter and rank the scored potential "meet-up" venues; provide the filtered and ranked "meet-up" venue options to the user and the accepted contacts; receive votes from the user and the accepted contacts relating to "meet-up" venue option selections; identify the "meet-up" venue receiving the most votes; and provide the identity of the "meet-up" venue receiving the most votes to the user and the accepted contacts. Optionally, the storage device further causes the processor to provide "business card" details of the selected "meet-up" venue option receiving the most votes to the user and the accepted contacts. Also optionally, the storage device further causes the processor to provide an indication to the user and the accepted contacts as to how long it will take for each to arrive at the selected "meet-up" venue option.

The methods and apparatus/system herein are applicable to any size number of users and to providing "meet-up" venues in a relatively large geographic area.

BRIEF DESCRIPTION OF THE DRAWINGS

Other and further objects, advantages and features of the present disclosure will be understood by reference to the following description in conjunction with the accompanying drawings, in which like reference characters denote like elements of structure.

DETAILED DESCRIPTION OF THE PREFERRED EMBODIMENTS

Figure 1:
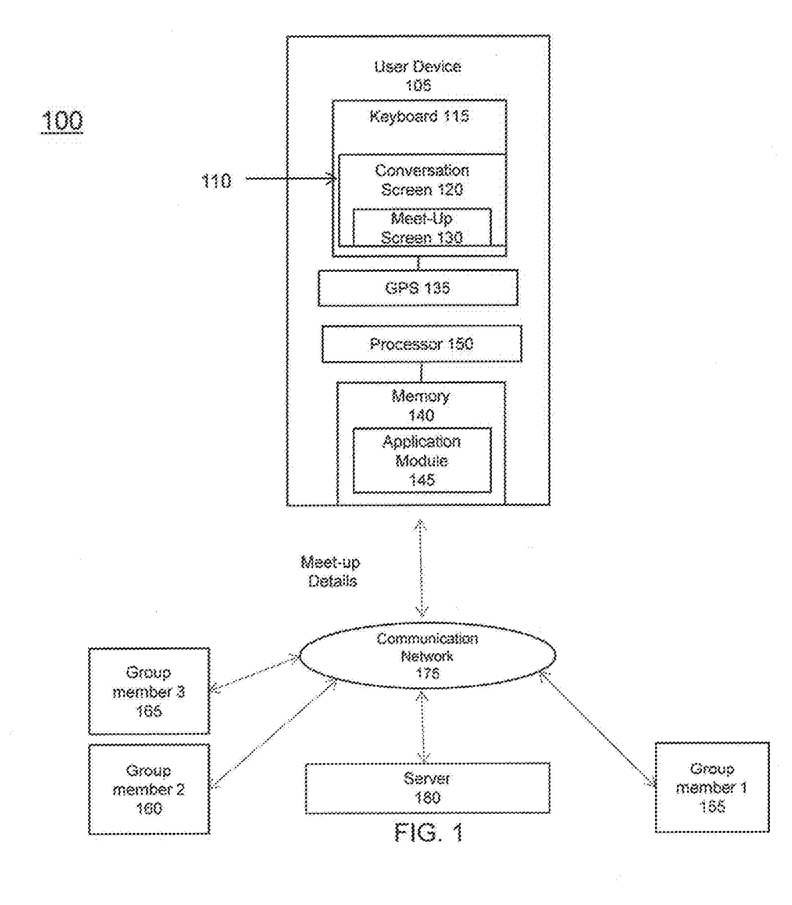
FIG. 1 is a block diagram of a system that employs the methods described herein.

Referring to FIG. 1, a system that employs the methods described herein is generally represented by reference numeral 100. System 100 includes a client server 180 and a user device 105 that are communicatively coupled to one another via a network 175, e.g., the Internet.

User device 105 includes a user interface 110. User interface 110 includes a keyboard 115, a conversation screen (display) 120 which, in turn, includes a meet up screen 130. Together, the components of user interface 110 provide user device 105 a mechanism by which system 100 presents information in visual form to a user and by which the user presents information in electronic form to client server 180 via communication network 175. System 100 presents the information by way of keyboard 115. User device 105 also includes a cursor control mechanism, such as a mouse, track-ball, joy stick, or a touch-screen, capability of display 110 that allows a user to manipulate a cursor (not shown) on display 110 for communicating additional information and command selections to user device 105 and client server 180 via network 175.

User device also includes a GPS receiver/transmitter 135, a memory 140, and an application module 145 as a component of memory 140. User device 105 can be implemented, for example, as, preferably, a portable device. The portable device can be, for example, a tablet or a cell phone.

User device also includes a processor 150 that is an electronic device configured of logic circuitry that responds to and executes instructions.

Memory 140 is a tangible computer-readable storage device encoded with a computer program. In this regard, memory 140 stores data and instructions readable and executable by processor 150 for controlling the operation of processor 150. Memory 140 can be implemented in a RAM, a hard drive, a ROM, or a combination thereof.

The term "module" is used herein to denote a functional operation that can be embodied either as a stand-alone component or as an integrated configuration of a plurality of subordinate components. Thus, application module 145 can be implemented as a single module or as a plurality of modules that operate in cooperation with one another. Moreover, although application module 145 are described herein as being installed in memory 140, and therefore being implemented in software, it could be implemented in any of hardware (e.g., electronic circuitry), firmware, software, or a combination thereof.

Also, although application module 145 is indicated as already being loaded into memory 140, it can be configured on a storage device (not shown) for subsequent loading into memory 140. Storage device (not shown) could be a tangible computer-readable storage medium that stores application module 145 thereon. Examples of suitable storage devices include a compact disk, a magnetic tape, a read only memory, an optical storage media, a hard drive or a memory unit consisting of multiple parallel hard drives, and a universal serial bus (USB) flash drive. Alternatively, a storage device can be a random access memory, or other type of electronic storage device, located on a remote storage system (not shown) and coupled to client server 180 and user device 105 via network 175.

Group member 1 155, group member 2 160, and group member 3 165 employ a user device 105 and are communicatively coupled to one another and to the user via network 175. Although FIG. 1 shows group member 1 155, group member 2 160, and group member 3 165 as being in direct communication with network 175, it will be understood that group member 1 155, group member 2 160, and group member 3 165 can communicate with network 175 via a user device 105 that is, generally, configured as described above.

Referring to FIGS. 2A-2D, the appearance at various stages of user's conversation screen 120 is shown according to the present disclosure.

Figures 2A, 2B:
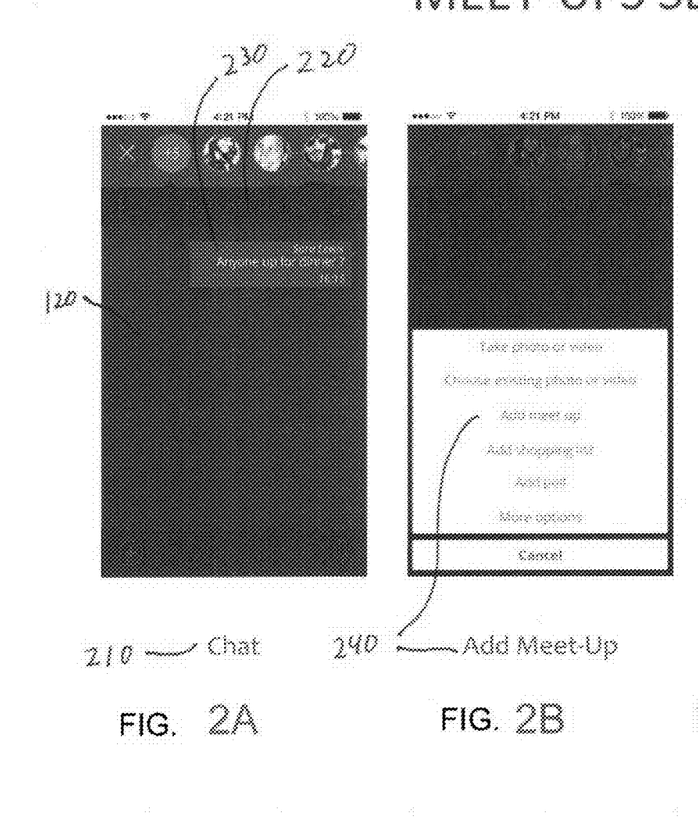
FIGS. 2A-2D illustrate an example showing the flow of a "meet-up" sender's display when creating a "meet-up"

In FIG. 2A, a user uses device 105 to have a chat 210 with a group 220 ("The Breakfast Club"). User enters via keyboard 115 a request 230 ("Anyone up for dinner?") to group 220 to meet up via conversation screen 120. The request is made via an application installed on device 105 to communicate with group 220. Of course, the user could select individuals in his/her contact list to whom to send the "meet-up" request rather than a pre-selected group, such as group 220. As mentioned, the application has conversation screen 120 with which the user interacts with people and groups in his/her contact list. As is typical in such user devices 105, the user can send messages, images or videos through conversation screen 120. The present disclosure introduces elements that go beyond the limitations of the standard conversation screen 120.

Figure 2C:
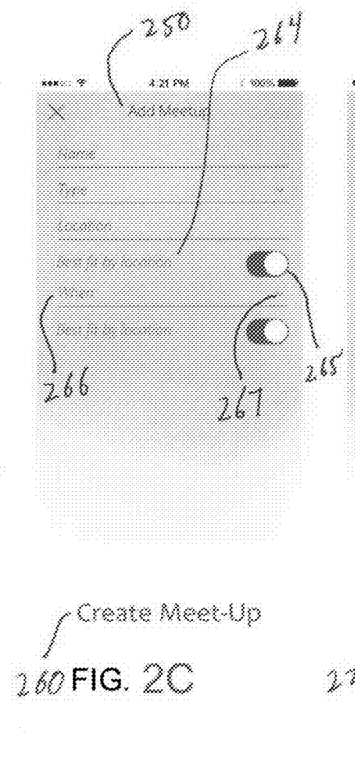
Figure 2D:
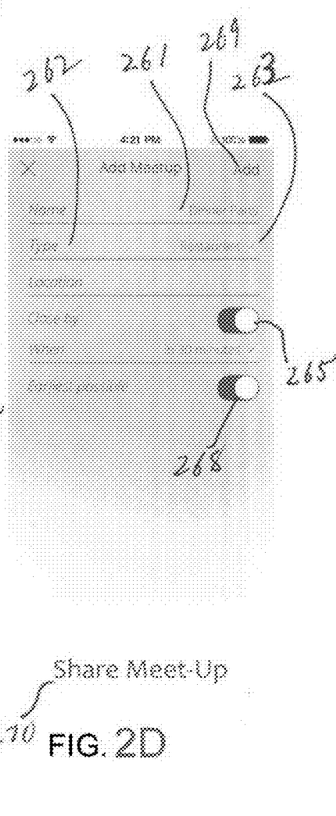

The application provides the user with a "meet-up" 240 option. When "meet-up" 240 is selected, the user can add a "meet-up" request to contacts such as group 220, or any plurality of groups and/or individuals in his/her contact list through "meet-up" screen 250. The user proceeds to create the "meet-up" details 260 by entering a description of the "meet-up". The user can name the "meet-up" 261 (e.g., "Dinner Party") via keyboard 115, can choose the type of "meet-up" 262 (e.g., Restaurant, Movie, Coffee Shops, etc.) via a drop down menu 263, can select the best fit by location 264 (e.g., "Close By") by switching on the "best fit by location" button 265, can select when 266 the "meet-up" time will be set, either by using a drop down menu 267 or set the "meet-up" for the "earliest possible" time by switching on the "earliest possible" button 268. As is known in the art, a user's contact list is stored in memory 140 on user device 105, and once "meet-up" screen 250 is filled, the user can add contacts with whom the "meet-up" request will be shared via an "Add" on "meet-up" screen 250, and share the "meet-up" details 260 with his/her "added" contacts/groups 270. "Add" button 269 sends the "meet-up" request to contacts/group members. Application module 145 sends "meet-up" details 260 to server 180 over communication network 175.

Figure 3A:
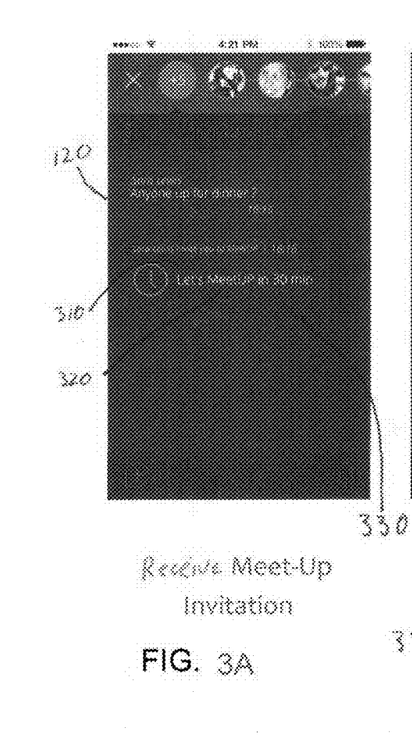
FIGS. 3A-3G illustrate an example showing the flow of a "meet-up" receiver's display when receiving a "meet-up".
Figure 3B:
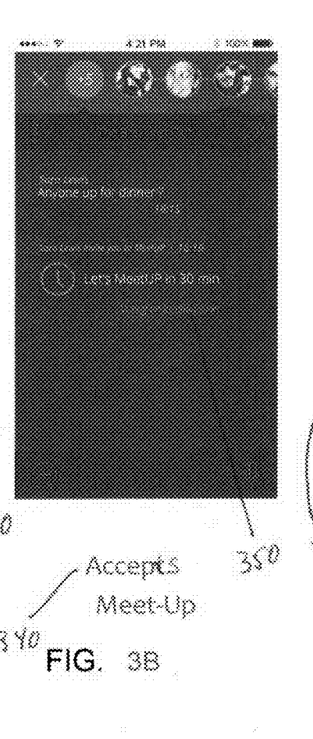

As shown in FIG. 3A, when user shares "meet-up" details 260 with "added" contacts/groups 270, each receives a "meet-up" invitation 310 in conversation screen 120. "Meet-up" invitation 310 includes the suggested meet up time 320 and the option to accept/decline 330 meet up invitation 310. At this point, as shown in FIG. 3B, each "added" contact/group 220 who accepts 340 meet up invitation 310 receives an indication of "voting on location soon" 350. Server 180 then sends requests over communication network 175 to the "accept" 330 "added" "meet-up" member devices (e.g., 155, 160, 165) to share the "meet-up" members 155, 160, 165 current locations via GPS receiver/transmitter 135 on each "meet-up" "accepted" member's 155, 160, 165 user device 105.

After server 180 receives all "accepted" member 155, 160, 165 user device 105 locations, server 180 performs scoring calculation for type of "meet-up" 262 and thereafter filters and ranks the most convenient locations in the area close by to all the participants and will provide options. In addition, as part of the calculation, the server also performs calculation and recommends on the most convenient time for the "meet-up" based on the time it takes for the group members to get to the location.

Scoring is performed by server 180 as follows. Server 180 creates a polygon 360 (see, e.g., FIG. 3E) from each "meet-up" member 155, 160, 165 identified current "point" location obtained via GPS receiver/transmitter 135 on each "meet-up" "accepted" member's 155, 160, 165 user device 105. Server 180 determines the centroid of polygon 360 using a centroid of polygon 360 calculation. The centroid of a non-self-intersecting closed polygon defined by "n" vertices (x0, y0), (x1, y1), . . . , (xn-1, yn-1) is the point (Cx, Cy), where $$C_x = \frac{1}{6A}\sum_{i=0}^{n-1}(x_i + x_{i+1})(x_i y_{i+1} - x_{i+1} y_i)$$

$$C_y = \frac{1}{6A}\sum_{i=0}^{n-1}(y_i + y_{i+1})(x_i y_{i+1} - x_{i+1} y_i)$$

and where A is the polygon's signed area, $$A = \frac{1}{2}\sum_{i=0}^{n-1}(x_i y_{i+1} - x_{i+1} y_i).$$

Sever 180 creates a radius based geo-fence. The radius is a size sufficient to make a circle containing the polygon, around the centroid of the polygon. This creates an area in which to look for the recommended venues. Based on type of "meet-up" 262, server 180 locates a list of "N" venues that are in the geo-fence that are possible "meet-up" venues around centroid point Cx, Cy using APIs that provide identities of possible venues and the locations of each around the centroid point Cx, Cy.

In addition, server 180 holds a database (not numbered) that has information about users and business. Among other information, the database of server 180 holds each "meet-up" "accepted" member's 155, 160, 165 (of course, each "meet-up" "accepted" member's 155, 160, 165 identity can change for each "meet-up") venue preferences (including "black lists" of undesirable venues), price range preferences and voting history (providing "historical preference", referred to below), as well as "business cards" for venues that include information such as, operating hours, menu (for restaurants), movie schedule (for cinemas), business review, business location, and the like.

Server 180 performs basic scoring by ranking the list of "N" venues based on the average time it takes for each of the "accepted" members 155, 160, 165 to arrive at each of the list of "N" venues. Server 180 determines the location point Xi, Yi=the location of each group member 'i'. Server 180 collects a list of Vj, location of venue j (taken from the returned list of "N" venues), and calculates Dij, the distance between group member 'i' and venue 'j'. Continuing, server 180 calculates the average Dj, i.e., the average distance between the group members and venue "j"

$$\text{Average } Dj = \left(\sum_{i=0}^{\infty} Dij\right)\bigg/n\bigg|.$$

The list of 'Average Dj' is sorted in ascending order (with shortest "Average Dj" ranked highest) by the distance from the specified venue. The following formula is used to calculate the time/distance scoring: If ("average (avg.) time distance">60), then the time distance score =0. If (0<"avg. time distance"<60), then the time distance score=60 −avg. time distance. After all venues are sorted by the average time distance, the server proceeds to performing advanced ranking.

The first step of advanced ranking is to filter out locations that should not be presented to "accepted" members 155, 160, 165 using the following criteria (among other possible criteria) from the information contained in the database on server 180. One criterion can be operating hours—if the location is currently closed (received via the APIs that provide identities of possible venues and the locations of each around the centroid point Cx, Cy), it is filtered out. Another criterion can be price ranges—if the location is out of a user's desired price range preference, it is filtered out. A third criterion can be dislikes—if a location is in a user's black lists, it is filtered out.

The second step of advanced ranking is to re-rank the remaining list factoring in additional parameters using, e.g., the information in the database on server 180. For example, re-ranking the remaining venues "j" can be based on the following additional parameters (or others). One additional parameter can be "accepted" members' 155, 160, 165 "preferences", and for each "match" between a user's preference and the venue "j", the venue "j" gets 1 point in the scoring. Another additional parameter can be "accepted" members' 155, 160, 165 "historical experience" with the venue "j", and for each historical "vote for" the venue "j" by an "accepted" member 155, 160, 165, the venue "j" gets 2 points in the scoring. A third additional parameter can be "location reviews", and using reviews that are generally between 1 to 5 stars, for each star the venue "j" has, the venue gets 1 point in the scoring.

A subset of the locations receiving the highest score(s) as a result of the scoring, filtering and ranking are sent back by server 180 to the "accepted" members 155, 160 and 165 over communication network 175 for a vote. The subset of locations can be any number but, usually, is limited to two (2) or three (3) locations so that conversation screens 120 of user devices 105 do not become overcrowded and difficult to view. Also, a small subset of locations provides for a more definitive vote result, as too many locations could "split the vote" into a non-definitive result. The systems and methods of the disclosure are capable of supporting a group "meet-up" in a relative large geographic area. Therefore, the scoring, ranking and filtering are essential to prevent overloading the users with too many options.

Figure 3C:
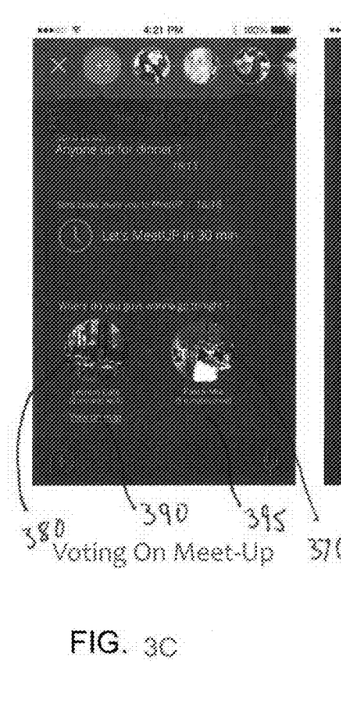
Figure 3D:
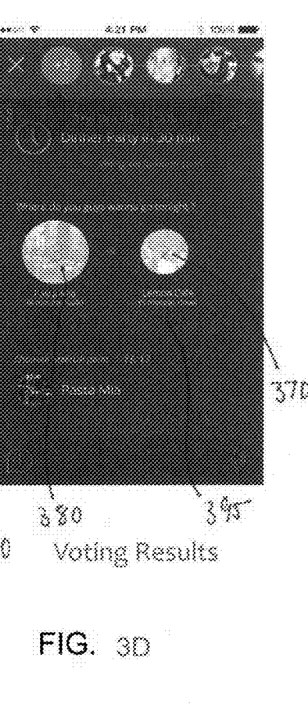
Figure 3E:
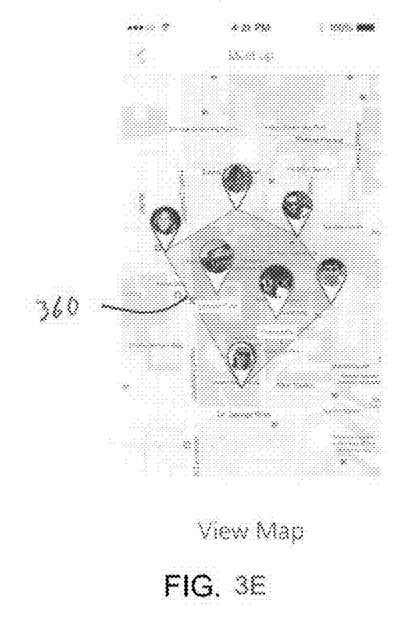

Referring to FIG. 3C, in the example shown, the top two locations, Pasta Mia 370 and Lemon Café 380, receiving the highest scores, as a result of the scoring, filtering and ranking, are presented on conversation screen 120 of "accepted" members user devices 105 for a vote as to "Where do you guys want to go tonight?" In addition, each "accepted" member is provided with a "time to location" unique to that "accepted" member. In the user device 105 conversation screen 120 shown in FIG. 3C, Lemon Café 380 is indicated as having an 8 minute walk "time to location" and Pasta Mia 370 is indicated as having a five minute drive "time to location". "Accepted" members vote on their desired location by touching the icon for Pasta Mia 370 or the icon for Lemon Café 380. As an additional option, the locations for Pasta Mia 370 and Lemon Café 380 can be seen on a geographic representation by touching the "view on map" option 390. If "view on map" 390 is touched, a "view map" as shown in FIG. 3E is presented on user device 105 conversation screen 120. As voting progresses, the icons for Pasta Mia 370 and Lemon Café 380 change to indicate the number of votes obtained for each, as shown in FIG. FIG. 3D.

Figure 3F:
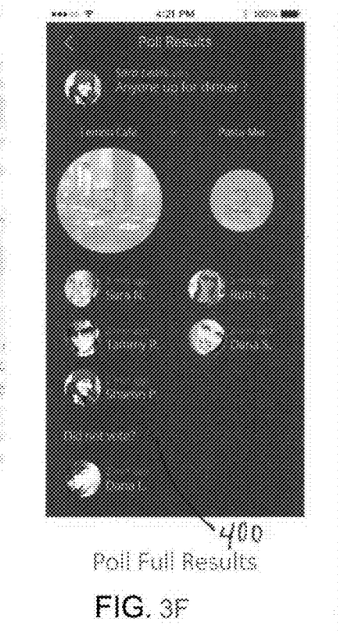
Figure 3G:
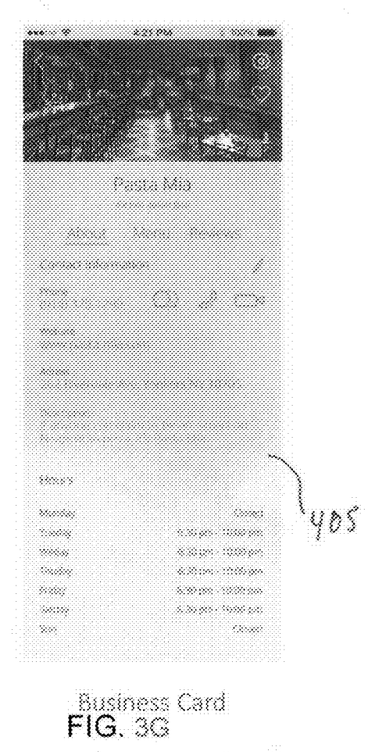

In the embodiment shown in FIG. 3F, the icons change in size and indicate the total votes "for" as voting progresses. A larger icon alone, without an indication of the total votes "for" could also indicate a larger vote total. Other changes could be provided for, such as a change in color or location of the icon on the user's displays. Touching "view results" 395 on conversation screen 120 presents the full poll results, including how each member of the group voted, as shown in FIG. 3F. As also indicated in FIG. 3F, one group member did not vote and can receive a "nudge" 400 to prompt the non-voting group member to vote. As a result, the location that receives most of the votes is, therefore, chosen as the "meet-up" location. Further, the group members receive the chosen location's "business card" details 405 as additional information, as shown in FIG. 3G. The additional information on the chosen location can include: for restaurants, food reviews, menus, directions, and the like; for movie theatres, movie reviews, show time schedules, directions, and the like; and for how to get there shops of any kind, a catalog of products, current sales/deals, coupons, and the like.

In addition, after the location is selected by the result of the vote, the system and method recommends the most suitable time to meet based on the following logic. "Meet-up" time=time now+(the time it takes to the most distant team member to arrive to the location).

EXAMPLE

User A has 3 contacts: contact B, contact C and contact D. User A forms a group with contact B, contact C and contact D. User A creates a "meet-up" of the type: "restaurant" and shares it with group members.

| Communication parameters | User A | Contact B | Contact C | Contact D |
| --- | --- | --- | --- | --- |
| User Location | User A (X1, Y1) | Contact B (X2, Y2) | Contact C (X3, Y3) | Contact D (X4, Y4) |
| Current Time | 10:00 | | | |
| Centroid of a non-self-intersecting closed polygon | | Cx, Cy | | |
| Locations of the type "restaurant" in the radius around Cx, Cy | | R1, R2, R3, R4, R5 | | |
| Time to location R1 | 5 minutes | 20 minutes ("meet-up" max time/distance) | 15 minutes | 8 minutes |
| Time to location R2 | 10 minutes | 15 minutes | 20 minutes ("meet-up" max time/distance) | 7 minutes |
| Time to location R3 | 12 minutes ("meet-up" max time/distance) | 7 minutes | 6 minutes | 11 minutes |
| Time to location R4 | 18 minutes | 25 minutes | 5 minutes | 24 minutes ("meet-up" max time/distance) |
| Time to location R5 | 25 minutes | 5 minutes | 20 minutes | 30 minutes ("meet-up" max time/distance) |

-continued

| | | | | |
|---|---|---|---|---|
| Dislike | No dislikes | Chinese | No dislikes | No dislikes |
| History | No history of voting | Voted for R1 and R4 in the past | Voted for R5 in the past | Voted for R5 and R2 in the past |
| Preference(s) | Italian, low cost | Italian, medium cost | French, medium cost | No specific preferences |
| Schedule | Free | Free | Free | Free |
| Average distance between group members and locations | | R1: (5 + 20 + 15 + 8)/4 = 12 minutes R2: (10 + 15 + 20 + 7)/4 = 13 minutes R3: (12 + 7 + 6 + 11)/4 = 9 minutes R4: (18 + 25 + 5 + 24)/4 = 18 minutes R5: (25 + 5 + 20 + 30)/4 = 20 minutes | | |
| Average Distance score | | R1: 60 − 12 = 48 R2: 60 − 13 = 47 R3: 60 − 9 = 51 R4: 60 − 18 = 42 R5: 60 − 20 = 50 | | |
| Price Range | | R1: 20-50 (low) R2: 70-100 (high) R3: 50-70 (medium) R4: 20-50 (low) R5: 50-70 (medium) | | |
| Operating hours | | R1: 09:00-20:00 (opened) R2: 09:00-17:00 (opened) R3: 12:00-18:00 (closed) R4: 10:00-22:00 (opened) R5: 09:00-18:00 (opened) | | |
| Restaurant type | | R1: Italian R2: Chinese R3: Bistro R4: French R5: Bistro | | |
| Reviews | | R1: 5star R2: 4 stars R3: 4 stars R4: 3 stars R5: 4 stars | | |
| Initial Ranking (by time/distance) | | R3 (score = 51) R1 (score = 48) R2 (score = 47) R4 (score = 42) R5 (score = 40) | | |
| Filtering | | Filtering out R3 as it is closed Filtering out R2 as contact B dislikes Chinese | | |
| Ranking After Filtering | | R1 (score = 48) R4 (score = 42) R5 (score = 40) | | |
| Additional parameters | | R1: Preference: +2 for Italian, +1 for low cost Reviews: +5 for 5 stars History vote: +2 for 1 history vote Total +9 points R4 Preference: +1 for Italian, +1 for low cost Reviews: +3 for 3 stars History vote: +2 for 1 history vote Total +6 points R5 Preference: +2 for medium cost Reviews: +4 for 4 stars History vote: +4 for 2 history vote Total +10 points | | |
| Final score and ranking | | R1 (score = 48 + 9 = 57) R5 (score = 40 + 10 = 50) R4 (score = 42 + 6 = 48) | | |

The highest ranked locations R1, R5 and R4 are presented to the group members for a vote. Users A, and contacts B and C vote for R1. Contact D votes for R5. As a result, R1 is chosen as the "meet-up" location. "Meet-up" time is set for current time +the time it takes to the most distant of user/contacts to arrive to the location=>10:00+20 minutes=>10:20

The terms "comprises" or "comprising" are to be interpreted as specifying the presence of the stated features, integers, steps or components, but not precluding the presence of one or more other features, integers, steps or components or groups thereof.

It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

What is claimed is:

1. A method for identifying and selecting a venue for a group of a user's contacts to meet-up upon receipt of a meet-up request from a user of a device, the method comprising:
   receiving an identification of a plurality of contacts to receive a transmission of the meet-up request to form identified contacts;
   transmitting the meet-up request to the identified contacts;
   receiving, from each identified contact, an indication of whether the identified contact accepts or declines the meet-up request to form groups of accepted contacts and declined contacts, respectively;
   identifying a point location of each accepted contact;
   creating a polygon from the identified point locations;
   identifying the centroid of the polygon;
   locating potential meet-up venue options in a geographic area defined by a radius around the centroid;
   scoring the located potential meet-up venue options;
   filtering and ranking the scored potential meet-up venue options;
   providing the filtered and ranked meet-up venue options to the user and the accepted contacts;
   receiving votes from the user and the accepted contacts relating to the filtered and ranked meet-up venue option selections;
   identifying the filtered and ranked meet-up venue option receiving the most votes; and
   providing the identity of the meet-up venue receiving the most votes to the user and the accepted contacts.

2. The method f according to claim 1, wherein receiving the meet-up request includes an instruction identifying the type of meet-up.

3. The method according to claim 2, further comprising providing business card details relating of the selected meet-up venue option receiving the most votes to the user and the accepted contacts.

4. The method according to claim 2, further comprising providing business card details relating of the selected meet-up venue option receiving the most votes to the user and the accepted contacts.

5. The method according to claim 1, further comprising providing to the user and the accepted contacts an indication of the time it will take each to arrive at the selected meet-up venue option.

6. The method according to claim 1, wherein the scoring the located potential meet-up venue options includes a plurality of factors.

7. The method according to claim 6, wherein the plurality of factors include schedule, interests of the user and accepted contacts, and availability.

8. A system for identifying and selecting a venue for a group of a user's contacts to meet-up that includes a processor and a memory that has instructions that are readable by the processor and cause the processor to:
   receive a meet-up request from a user of a device;
   receive an identification of a plurality of user contacts to receive a transmission of the meet-up request to form identified contacts;
   transmit the meet-up request to the identified contacts;
   receive, from each identified contact, an indication of whether the contact accepts or declines the meet-up request to form groups of accepted and declined contacts, respectively;
   identify a point location of each accepted contact;
   create a polygon from the identified point locations;
   identify the centroid of the polygon;
   locate potential meet-up venue options in a geographic area defined by a radius around the centroid;
   score the located potential meet-up venue options;
   filter and rank the scored potential meet-up venue options;
   provide the filtered and ranked meet-up venue options to the user and the accepted contacts;
   receive votes from the user and the accepted contacts relating to the filtered and ranked meet-up venue option selections;
   identify the filtered and ranked meet-up venue option receiving the most votes; and
   provide the identity of the meet-up venue receiving the most votes to the user and the accepted contacts.

9. The system according to claim 8, wherein the instructions further cause the processor to receive an identification of the type of meet-up.

10. The system according to claim 9, wherein the instructions further cause the processor to provide business card details relating to the selected meet-up venue option receiving the most votes to the user and the accepted contacts.

11. The system according to claim 8, wherein the instructions further cause the processor to provide business card details relating to the selected meet-up venue option receiving the most votes to the user and the accepted contacts.

12. The system according to claim 9, wherein the instructions further cause the processor to provide to the user and the accepted contact an indication of the time it will take each to arrive at the selected meet-up venue option.

13. The system according to claim 8, wherein the instructions further cause the processor to provide to the user and the accepted contact an indication of the time it will take each to arrive at the selected meet-up venue option.

14. A storage device comprising instructions that are readable by a processor and cause the processor to:
   receive a meet-up request from a user of a device;
   receive an identification of a plurality of user contacts to receive a transmission of the meet-up request to from identified contacts;
   transmit the meet-up request to the identified contacts;
   receive, from each identified contact, an indication of whether the contact accepts or declines the meet-up request to form groups of accepted and declined contacts, respectively;
   identify a point location of each accepted contact;
   create a polygon from the identified point locations;
   identify the centroid of the polygon;
   locate potential meet-up venue options in a geographic area defined by a radius around the centroid;
   score the located potential meet-up venue options;
   filter and rank the scored potential meet-up venue options;
   provide the filtered and ranked meet-up venue options to the user and the accepted contacts;
   receive votes from the user and the accepted contacts relating to the filtered and ranked meet-up venue option selections;
   identify the filtered and ranked meet-up venue option receiving the most votes; and
   provide the identity of the meet-up venue receiving the most votes to the user and the accepted contacts.

15. The storage device according to claim 14, wherein the instructions further cause the processor to receive an identification of the type of meet-up.

16. The storage device according to claim 15, wherein the instructions further cause the processor to provide business card details relating to the selected meet-up venue option receiving the most votes to the user and the accepted contacts.

17. The storage device according to claim 16, wherein the instructions further cause the processor to provide to the user and the accepted contacts an indication of the time it will take each to arrive at the selected meet-up venue option.

18. The storage device according to claim 14, wherein the instructions further cause the processor to provide business card details relating to the selected meet-up venue option receiving the most votes to the user and the accepted contacts.

19. The storage device according to claim 18, wherein the instructions further cause the processor to provide to the user and the accepted contacts an indication of the time it will take each to arrive at the selected meet-up venue option.

20. The storage device according to claim 14, wherein the instructions further cause the processor to provide to the user and the accepted contacts an indication of the time it will take each to arrive at the selected meet-up venue option.

\* \* \* \* \*